US012521761B2

(12) United States Patent
Jiang et al.

(10) Patent No.: US 12,521,761 B2
(45) Date of Patent: Jan. 13, 2026

(54) ULTRASONIC OSCILLATOR ELEMENT AND ULTRASONIC TRANSDUCER DEVICE

(71) Applicant: Qisda Corporation, Taoyuan (TW)

(72) Inventors: Fu-Sheng Jiang, Taoyuan (TW); Yang-Zong Fan, Taoyuan (TW)

(73) Assignee: Qisda Corporation, Taoyuan (TW)

( * ) Notice: Subject to any disclaimer, the term of this patent is extended or adjusted under 35 U.S.C. 154(b) by 0 days.

(21) Appl. No.: 18/938,290

(22) Filed: Nov. 6, 2024

(65) Prior Publication Data

US 2025/0153220 A1 May 15, 2025

(30) Foreign Application Priority Data

Nov. 13, 2023 (TW) ................................ 112143597

(51) Int. Cl.
*B06B 1/06* (2006.01)

(52) U.S. Cl.
CPC .................................. *B06B 1/0662* (2013.01)

(58) Field of Classification Search
CPC ............................ B06B 1/0662; B06B 1/0292
USPC ......................................................... 331/158
See application file for complete search history.

(56) References Cited

U.S. PATENT DOCUMENTS

2009/0322181 A1* 12/2009 Machida ............... B06B 1/0292 310/300
2019/0205595 A1 7/2019 Gong et al.
2019/0366382 A1* 12/2019 Akiyama .............. B06B 1/0215

FOREIGN PATENT DOCUMENTS

| | | |
|---|---|---|
| CN | 110508474 | 11/2019 |
| CN | 109174595 | 7/2020 |
| TW | 202216308 | 5/2022 |

OTHER PUBLICATIONS

"Notice of allowance of Taiwan Counterpart Application", issued on Dec. 4, 2024, p. 1-p. 4.

* cited by examiner

*Primary Examiner* — Richard Tan

(57) ABSTRACT

An ultrasonic oscillator element, including a substrate, a first lower electrode, a first insulating layer, a second insulating layer, a second lower electrode, a first upper electrode, and a third insulating layer. The first lower electrode is disposed on the substrate. The first insulating layer is disposed so that the first lower electrode is located between the first insulating layer and the substrate. The second insulating layer and the first insulating layer form a first cavity. The second lower electrode is disposed adjacent to the first side of the second insulating layer and located in the outer region of the first cavity. The first upper electrode is disposed on the second side of the second insulating layer. The third insulating layer is disposed so that the second lower electrode is located between the third insulating layer and the first insulating layer.

20 Claims, 9 Drawing Sheets

100B

ULTRASONIC OSCILLATOR ELEMENT AND ULTRASONIC TRANSDUCER DEVICE

CROSS-REFERENCE TO RELATED APPLICATION

This application claims the priority benefit of Taiwan application serial no. 112143597, filed on Nov. 13, 2023. The entirety of the above-mentioned patent application is hereby incorporated by reference herein and made a part of this specification.

BACKGROUND

Technical Field

This disclosure relates to an ultrasonic oscillator element and an ultrasonic transducer device, and in particular, to an ultrasonic oscillator element and an ultrasonic transducer device.

Description of Related Art

In the current development of ultrasonic transducers, they can be categorized into bulk piezoelectric ceramics transducers, capacitive micromachined ultrasonic transducers (CMUT), and piezoelectric micromachined ultrasonic transducer (PMUT). However, since micromachined ultrasonic transducers are manufactured through microelectromechanical systems MEMS process, they have greater process compatibility with integrated circuits, thus becoming the best realization solution for miniaturized ultrasonic systems. Therefore, it can be further realized in large-scale fabrication and packaging for applications in the fields of nondestructive testing, medical imaging, ultrasonic microscopy, fingerprint recognition, or Internet of Things. However, in the current structure of capacitive micromachined ultrasonic transducers, how to increase the capacitance value to enhance the sensitivity of the transducer is one of the goals for the development of this field.

SUMMARY

The disclosure provides an ultrasonic oscillator element and an ultrasonic transducer device, capable of significantly reducing an electrode separation distance in an effective region, which in turn increases capacitance and thus significantly improves working efficiency of a firm.

The disclosure provides an ultrasonic oscillator element, including a substrate, a first lower electrode, a first insulating layer, a second insulating layer, a second lower electrode, a first upper electrode, and a third insulating layer. The first lower electrode is disposed on the substrate. The first insulating layer is disposed so that the first lower electrode is located between the first insulating layer and the substrate. The second insulating layer and the first insulating layer form a first cavity. The first cavity is located between the first insulating layer and the second insulating layer. The first cavity includes a central region and an outer region. The second insulating layer has a first side and a second side opposite to each other. The second lower electrode is disposed adjacent to the first side of the second insulating layer and located in the outer region of the first cavity. The first upper electrode is disposed on the second side of the second insulating layer. The third insulating layer is disposed so that the second lower electrode is located between the third insulating layer and the first insulating layer.

In an embodiment of the disclosure, the first cavity is located between the first lower electrode and the second lower electrode.

In an embodiment of the disclosure, the first upper electrode includes a first portion and a second portion, at least part of the first portion overlaps the central region of the first cavity in a stacking direction, and at least part of the second portion overlaps the outer region of the first cavity in the stacking direction.

In an embodiment of the disclosure, at least part of the first lower electrode overlaps the first portion of the first upper electrode in the stacking direction.

In an embodiment of the disclosure, at least part of the second lower electrode overlaps the second portion of the first upper electrode in the stacking direction.

In an embodiment of the disclosure, the first portion of the first upper electrode is driven by a DC signal relative to the first lower electrode to cause the second insulating layer to be concave toward the first cavity.

In an embodiment of the disclosure, the second portion of the first upper electrode is driven by an AC signal to oscillate relative to the second lower electrode.

In an embodiment of the disclosure, the second lower electrode overlaps at least part of the first lower electrode in a stacking direction.

In an embodiment of the disclosure, the ultrasonic oscillator element further includes a fourth insulating layer disposed in the first cavity. The second lower electrode is located between the second insulating layer and the fourth insulating layer.

In an embodiment of the disclosure, the ultrasonic oscillator element further includes a second upper electrode and a fifth insulating layer. The second upper electrode is disposed so that the third insulating layer is located between the second upper electrode and the first upper electrode. The fifth insulating layer is disposed so that the second upper electrode is located between the fifth insulating layer and the third insulating layer.

In an embodiment of the disclosure, the ultrasonic oscillator element further includes a second cavity disposed between the second upper electrode and the first upper electrode.

In an embodiment of the disclosure, the second cavity is adjacently disposed on any side of the third insulating layer or inside the third insulating layer.

The disclosure provides an ultrasonic transducer device, including multiple ultrasonic oscillator elements disposed in an array. Each of the ultrasonic oscillator elements includes a substrate, a first lower electrode, a first insulating layer, a second insulating layer, a second lower electrode, a first upper electrode, and a third insulating layer. The first lower electrode is disposed on the substrate. The first insulating layer is disposed so that the first lower electrode is located between the first insulating layer and the substrate. The second insulating layer and the first insulating layer form a first cavity. The first cavity is located between the first insulating layer and the second insulating layer. The first cavity includes a central region and an outer region. The second insulating layer has a first side and a second side opposite to each other. The second lower electrode is disposed adjacent to the first side of the second insulating layer and located in the outer region of the first cavity. The first upper electrode is disposed on the second side of the second insulating layer. The third insulating layer is disposed so that the second lower electrode is located between the third insulating layer and the first insulating layer.

In an embodiment of the disclosure, the first upper electrode includes a first portion and a second portion, at least part of the first portion overlaps the central region of the first cavity in a stacking direction, and at least part of the second portion overlaps the outer region of the first cavity in the stacking direction.

In an embodiment of the disclosure, at least part of the first lower electrode overlaps the first portion of the first upper electrode in the stacking direction.

In an embodiment of the disclosure, at least part of the second lower electrode overlaps the second portion of the first upper electrode in the stacking direction.

In an embodiment of the disclosure, the each of the ultrasonic oscillator elements further includes a fourth insulating layer disposed in the first cavity to cover. The second lower electrode is located between the second insulating layer and the fourth insulating layer.

In an embodiment of the disclosure, the each of the ultrasonic oscillator elements further includes a second upper electrode and a fifth insulating layer. The second upper electrode is disposed so that the third insulating layer is located between the second upper electrode and the first upper electrode. The fifth insulating layer is disposed so that the second upper electrode is located between the fifth insulating layer and the third insulating layer.

In an embodiment of the disclosure, the each of the ultrasonic oscillator elements further includes a second cavity disposed between the second upper electrode and the first upper electrode.

In an embodiment of the disclosure, the second cavity is adjacently disposed on any side of the third insulating layer or inside the third insulating layer.

Based on the above, in the ultrasonic oscillator element and the ultrasonic transducer device in the disclosure, the ultrasonic oscillator element includes a substrate, a first lower electrode, a first insulating layer, a second insulating layer, a second lower electrode, a first upper electrode, and a third insulating layer. The second insulating layer and the first insulating layer form a first cavity, and the first cavity includes a central region and an outer region. The first lower electrode is disposed on the substrate, and the second lower electrode is disposed adjacent to the second insulating layer and located in the outer region of the first cavity, so that the first cavity is located between the first lower electrode and the second lower electrode. In this way, an electrode separation distance in an effective region may be greatly reduced, which in turn increases the capacitance and thus significantly improves the working efficiency of the capacitive micromachined ultrasonic transducer film.

To make the aforementioned more comprehensible, several embodiments accompanied with drawings are described in detail as follows.

BRIEF DESCRIPTION OF THE DRAWINGS

The accompanying drawings are included to provide a further understanding of the disclosure, and are incorporated in and constitute a part of this specification. The drawings illustrate example embodiments of the disclosure and, together with the description, serve to explain the principles of the disclosure.

DESCRIPTION OF THE EMBODIMENTS

Figure 1:
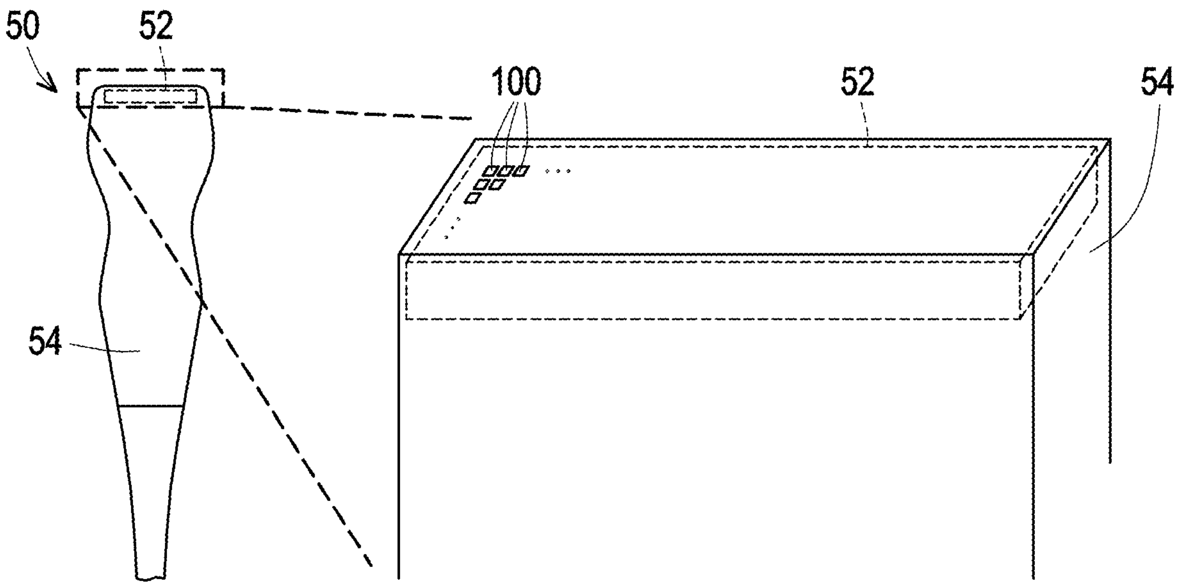
FIG. 1 is a schematic view of an ultrasonic transducer device according to an embodiment of the disclosure.

FIG. 1 is a schematic view of an ultrasonic transducer device according to an embodiment of the disclosure. Referring to FIG. 1, this embodiment provides an ultrasonic transducer device 50 that includes multiple ultrasonic oscillator elements 100, such as a capacitive micromachined ultrasonic transducer, which can be used in fields such as nondestructive testing, medical imaging, ultrasonic microscopy, fingerprint recognition, or Internet of Things, and the disclosure is not limited thereto. For example, multiple ultrasonic oscillator elements 100 may be disposed in an array on a base 52 and disposed on an end side of a housing 54. However, the disclosure does not limit the types and forms of the ultrasonic transducer device 50.

Figure 2A:
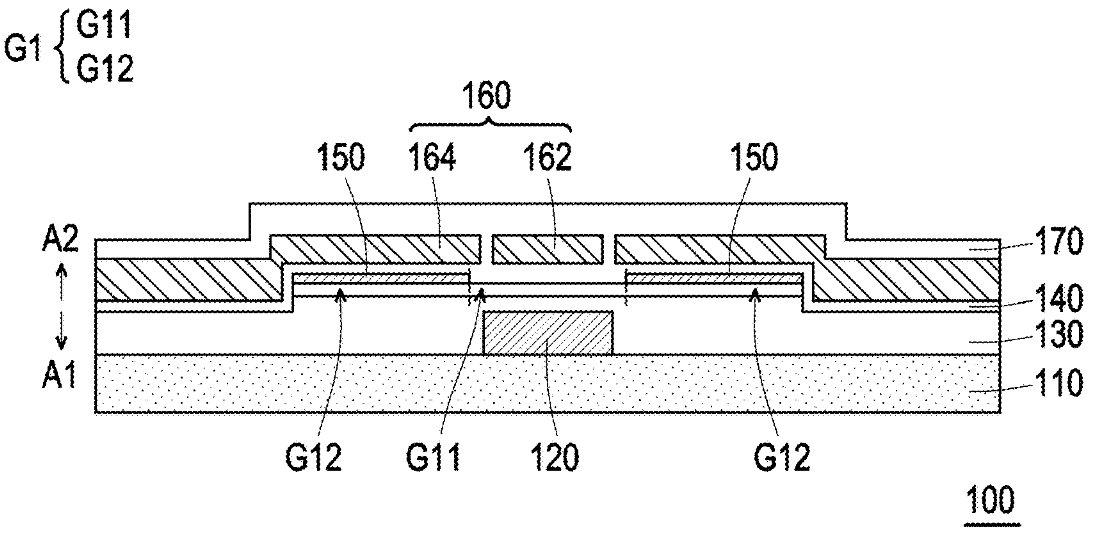
FIG. 2A is a schematic cross-sectional view of an ultrasonic oscillator element according to another embodiment of the disclosure.
Figure 2B:
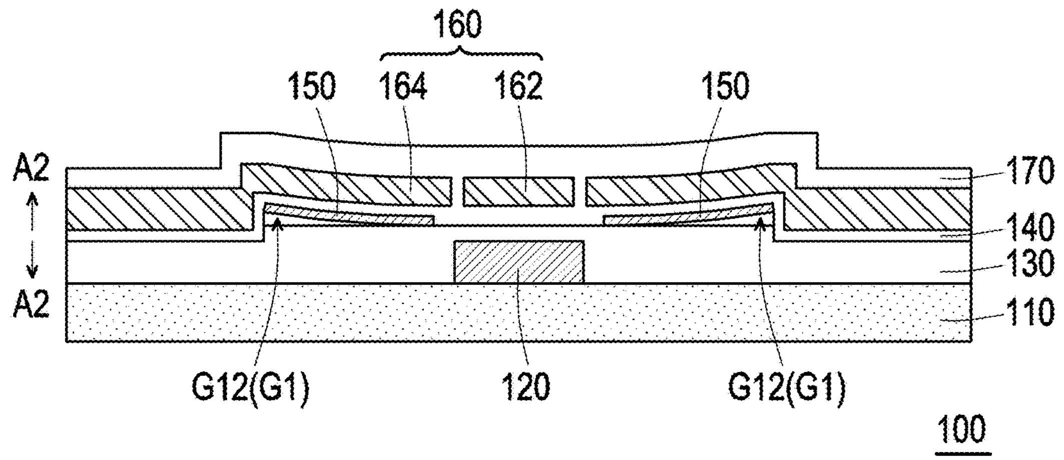
FIG. 2B is a schematic diagram of the ultrasonic oscillator element in FIG. 2A oscillating.

FIG. 2A is a schematic cross-sectional view of an ultrasonic oscillator element according to another embodiment of the disclosure. FIG. 2B is a schematic diagram of the ultrasonic oscillator element in FIG. 2A oscillating. Referring to FIG. 2A and FIG. 2B, an ultrasonic oscillator element 100 shown in this embodiment may be applied to at least the ultrasonic transducer device 50 shown in FIG. 1, and is therefore illustrated hereinafter by way of example. The ultrasonic oscillator element 100 includes a substrate 110, a first lower electrode 120, a first insulating layer 130, a second insulating layer 140, a second lower electrode 150, a first upper electrode 160, and a third insulating layer 170. The first lower electrode 120 is disposed on the substrate 110, and the first insulating layer 130 is disposed so that the first lower electrode 120 is located between the first insulating layer 130 and the substrate 110. The second insulating layer 140 and the first insulating layer 130 form a first cavity G1, where the first cavity G1 is located between the first insulating layer 130 and the second insulating layer 140. The first cavity G1 includes a central region G11 and an outer region G12. The second insulating layer 140 has a first side A1 and a second side A2 opposite to each other. The second lower electrode 150 is disposed adjacent to the first side A1 of the second insulating layer 140 and is located in the outer region G12 of the first cavity G1. Different from the traditional configuration design, in this embodiment, the first cavity G1 is located between the first lower electrode 120 and the second lower electrode 150. In this way, an electrode separation distance in an effective region may be greatly reduced, which in turn increases the capacitance and thus significantly improves the working efficiency of the capacitive micromachined ultrasonic transducer film.

The first upper electrode 160 is disposed on the second side A2 of the second insulating layer 140. The third insulating layer 170 is disposed so that the second lower electrode 150 is located between the third insulating layer 170 and the first insulating layer 130. Specifically, in this embodiment, the first upper electrode 160 includes a first portion 162 and a second portion 164. At least part of the first portion 162 overlaps the central region G11 of the first cavity G1 in a stacking direction. At least part of the second portion 164 overlaps the outer region G12 of the first cavity G1 in the stacking direction. On the other hand, in this embodiment, at least part of the first lower electrode 120 overlaps the first portion 162 of the first upper electrode 160 in the stacking direction. At least part of the second lower electrode 150 overlaps the second portion 164 of the first upper electrode 160 in the stacking direction. Thus, in this embodiment, the ultrasonic oscillator element 100 may be operated by applying a DC signal and an AC signal to different electrode portions of the ultrasonic oscillator element 100 respectively.

Specifically, when not in operation, the ultrasonic oscillator element 100 is not energized with a DC signal, and the structural appearance is as shown in FIG. 2A. In operation, a DC signal is first applied to the first lower electrode 120 and the first portion 162 of the first upper electrode 160, so that the first portion 162 of the first upper electrode 160 is driven by the DC signal to produce a pulling effect relative to the first lower electrode 120, which causes the second insulating layer 140, the second lower electrode 150, the first upper electrode 160, and the third insulating layer 170 to be concave toward the first cavity G1 to present a curved state, as shown in FIG. 2B. On the other hand, an AC signal is applied to the second lower electrode 150 and the second portion 164 of the first upper electrode 160 to cause the second portion 164 of the first upper electrode 160 to oscillate relative to the second lower electrode 150 driven by the AC signal. In other words, in this embodiment, the outer region G12 of the first cavity G1 is the main oscillation working region, and a thickness of the second insulating layer 140 between the second lower electrode 150 and the first upper electrode 160 is a working distance. In this way, the design of this embodiment may significantly reduce the electrode separation distance in the effective region (e.g., the electrode separation distance in the effective region may be reduced to half of the electrode separation distance in the effective region of the conventional structure), which in turn increases the capacitance and thus significantly improves the working efficiency of the firm.

Figure 3A:
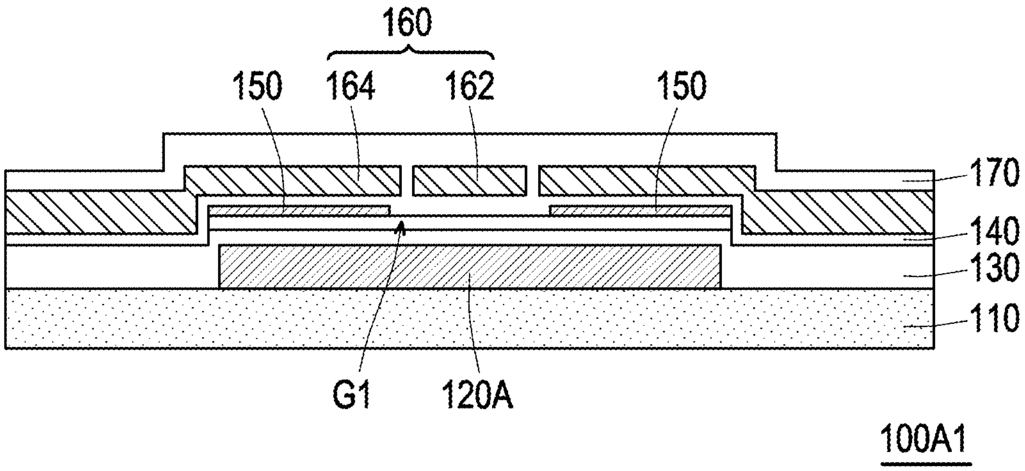
FIG. 3A and FIG. 3B are respectively schematic cross-sectional views of ultrasonic oscillator elements according to different embodiments of the disclosure.
Figure 3B:
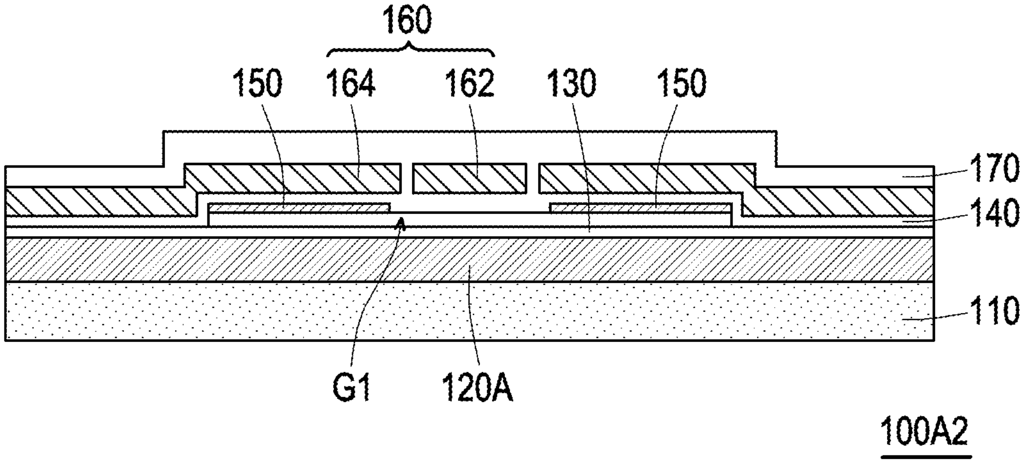

FIG. 3A and FIG. 3B are respectively schematic cross-sectional views of ultrasonic oscillator elements according to different embodiments of the disclosure. Referring to FIG. 3A first, an ultrasonic oscillator element 100A1 shown in this embodiment is similar to the ultrasonic oscillator element 100 shown in FIG. 2A. The difference between the two is that in this embodiment, an area of a first lower electrode 120A in the horizontal direction may be designed to increase so that the second lower electrode 150 overlaps at least part of the first lower electrode 120A in the stacking direction. In this way, since the area of the ground electrode is increased, the signal quality may be increased. Referring to FIG. 3B, in another embodiment, an area of the first lower electrode 120A of an ultrasonic oscillator element 100A2 in the horizontal direction may be designed to be increased beyond a range of the second lower electrode 150 in the stacking direction, or even completely overlap with the substrate 110 in the stacking direction. In this way, during the preparation of the first lower electrode 120A, the first lower electrodes 120A of multiple ultrasonic oscillator elements 100A2 may be electrically connected to increase the process convenience and electrical performance of the first lower electrode 120A, as shown in FIG. 3B.

Figure 4A:
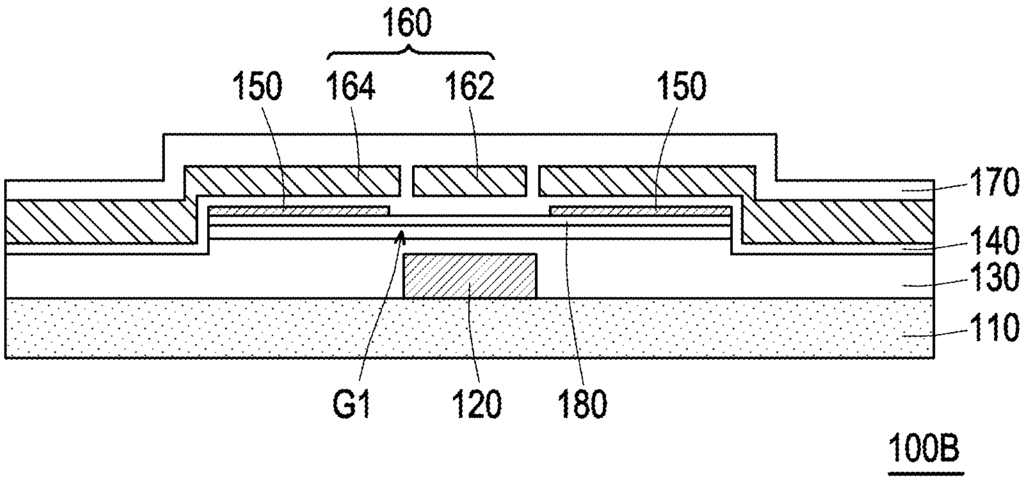
FIG. 4A is a schematic cross-sectional view of an ultrasonic oscillator element according to another embodiment of the disclosure.
Figure 4B:
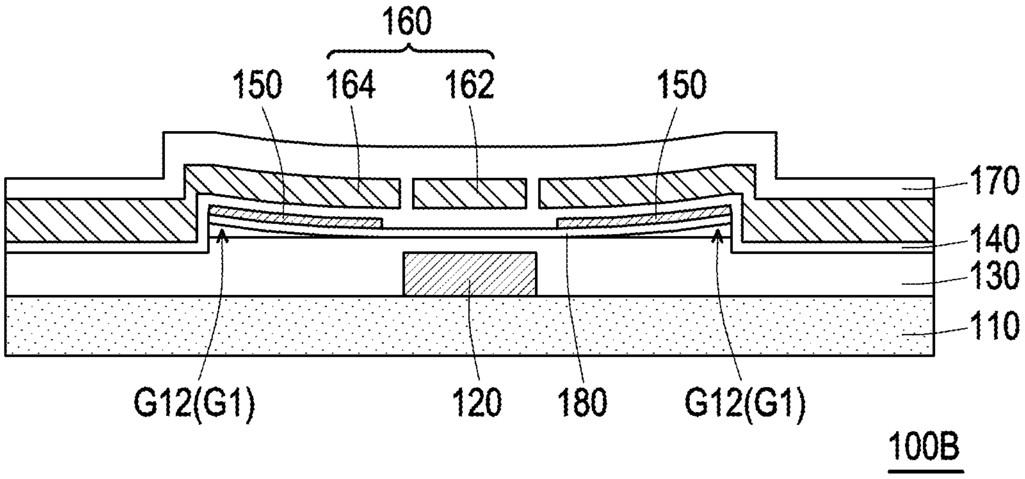
FIG. 4B is a schematic diagram of the ultrasonic oscillator element in FIG. 4A oscillating.

FIG. 4A is a schematic cross-sectional view of an ultrasonic oscillator element according to another embodiment of the disclosure. FIG. 4B is a schematic diagram of the ultrasonic oscillator element in FIG. 4A oscillating. Referring to FIG. 4A and FIG. 4B, an ultrasonic oscillator element 100B shown in this embodiment is similar to the ultrasonic oscillator element 100 shown in FIG. 2A and FIG. 2B. The difference between the two is that in this embodiment, the ultrasonic oscillator element 100B further includes a fourth insulating layer 180 disposed in the first cavity G1, and the second lower electrode 150 is located between the second insulating layer 140 and the fourth insulating layer 180. In this way, the manufacturing process may be simplified and the manufacturing yield of the ultrasonic oscillator element 100B may be improved.

Figure 5:
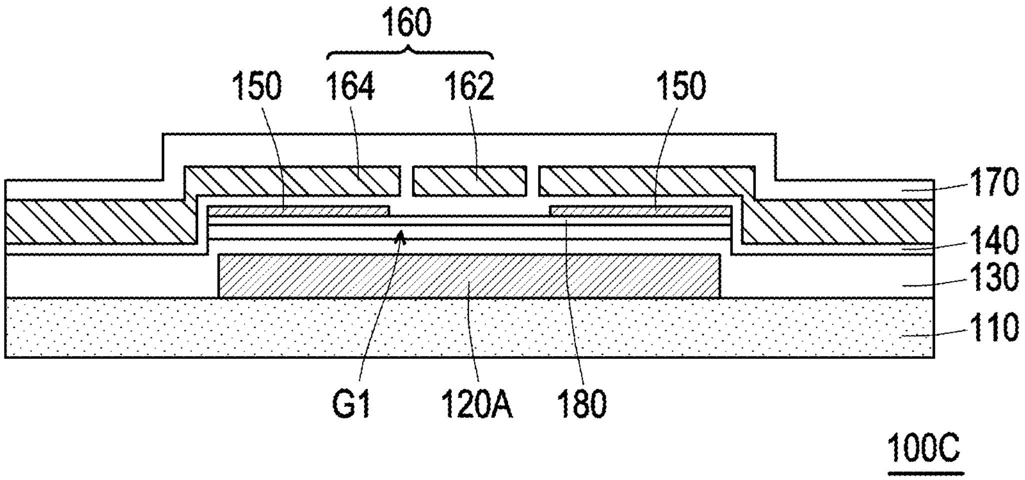
FIG. 5 is a schematic cross-sectional view of an ultrasonic oscillator element according to another embodiment of the disclosure.

FIG. 5 is a schematic cross-sectional view of an ultrasonic oscillator element according to another embodiment of the disclosure. Referring to FIG. 5, an ultrasonic oscillator element 100C shown in this embodiment is similar to the ultrasonic oscillator element 100B shown in FIG. 4A. The difference between the two is that in this embodiment, an area of the first lower electrode 120A in the horizontal direction may be designed to increase so that the second lower electrode 150 overlaps at least part of the first lower electrode 120A in the stacking direction. In this way, since the area of the ground electrode is increased, the signal quality may be increased. In another embodiment, the area of the first lower electrode 120A in the horizontal direction may be designed to be increased beyond the range of the second lower electrode 150 in the stacking direction, or even completely overlap with the substrate 110 in the stacking direction (not shown).

Figure 6:
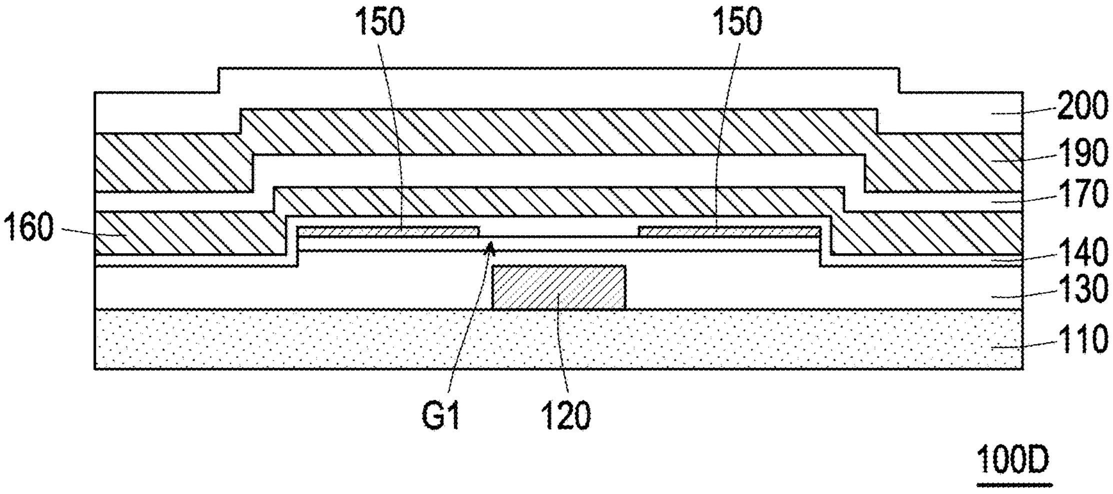
FIG. 6 is a schematic cross-sectional view of an ultrasonic oscillator element according to another embodiment of the disclosure.

FIG. 6 is a schematic cross-sectional view of an ultrasonic oscillator element according to another embodiment of the disclosure. Referring to FIG. 6, an ultrasonic oscillator element 100D shown in this embodiment is similar to the ultrasonic oscillator element 100 shown in FIG. 2A. The difference between the two is that in this embodiment, the ultrasonic oscillator element 100D further includes a second upper electrode 190 and a fifth insulating layer 200. Specifically, the second upper electrode 190 is disposed so that the third insulating layer 170 is located between the second upper electrode 190 and the first upper electrode 160. The fifth insulating layer 200 is disposed so that the second upper electrode 190 is located between the fifth insulating layer 200 and the third insulating layer 170. In this way, a transducer structure with dual upper electrodes may be formed, which enhances sensing sensitivity.

Figure 7:
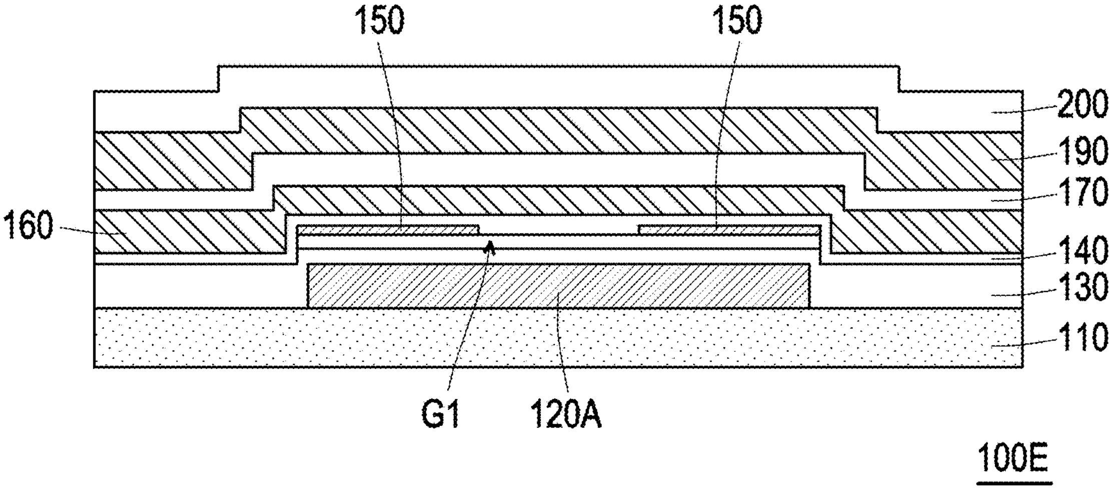
FIG. 7 is a schematic cross-sectional view of an ultrasonic oscillator element according to another embodiment of the disclosure.

FIG. 7 is a schematic cross-sectional view of an ultrasonic oscillator element according to another embodiment of the disclosure. Referring to FIG. 7, an ultrasonic oscillator element 100E shown in this embodiment is similar to the ultrasonic oscillator element 100D shown in FIG. 6. The difference between the two is that in this embodiment, the area of the first lower electrode 120A in the horizontal direction may be designed to increase so that the second lower electrode 150 overlaps at least part of the first lower electrode 120A in the stacking direction. In this way, since the area of the ground electrode is increased, the signal quality may be increased. In another embodiment, the area of the first lower electrode 120A in the horizontal direction may be designed to be increased beyond the range of the second lower electrode 150 in the stacking direction, or even completely overlap with the substrate 110 in the stacking direction (not shown).

Figure 8:
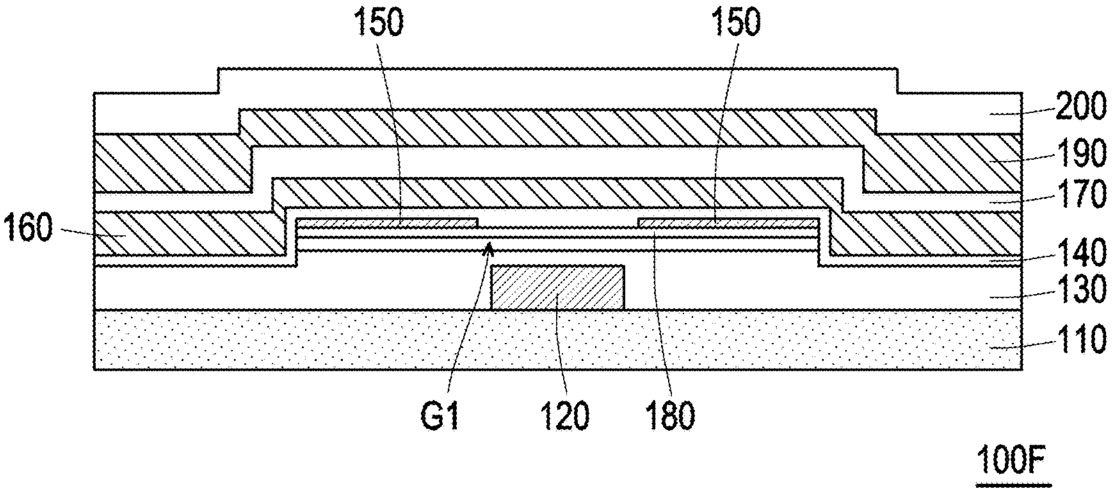
FIG. 8 is a schematic cross-sectional view of an ultrasonic oscillator element according to another embodiment of the disclosure.

FIG. 8 is a schematic cross-sectional view of an ultrasonic oscillator element according to another embodiment of the disclosure. Referring to FIG. 8, an ultrasonic oscillator element 100F shown in this embodiment is similar to the ultrasonic oscillator element 100D shown in FIG. 6. The difference between the two is that in this embodiment, the ultrasonic oscillator element 100F further includes a fourth insulating layer 180 disposed in the first cavity G1, and the second lower electrode 150 is located between the second insulating layer 140 and the fourth insulating layer 180. In this way, the manufacturing process may be simplified and the manufacturing yield of the ultrasonic oscillator element 100F may be improved.

Figure 9:
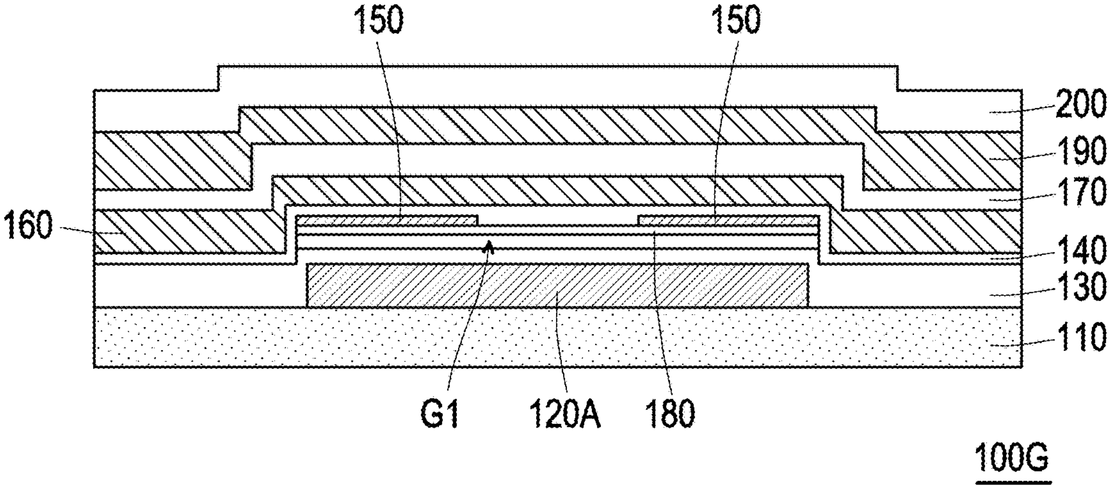
FIG. 9 is a schematic cross-sectional view of an ultrasonic oscillator element according to another embodiment of the disclosure.

FIG. 9 is a schematic cross-sectional view of an ultrasonic oscillator element according to another embodiment of the disclosure. Referring to FIG. 9, an ultrasonic oscillator element 100G shown in this embodiment is similar to the ultrasonic oscillator element 100F shown in FIG. 8. The difference between the two is that in this embodiment, the area of the first lower electrode 120A in the horizontal direction may be designed to increase so that the second lower electrode 150 overlaps at least part of the first lower electrode 120A in the stacking direction. In this way, since the area of the ground electrode is increased, the signal quality may be increased. In another embodiment, the area of the first lower electrode 120A in the horizontal direction may be designed to be increased beyond the range of the second lower electrode 150 in the stacking direction, or even completely overlap with the substrate 110 in the stacking direction (not shown).

Figure 10:
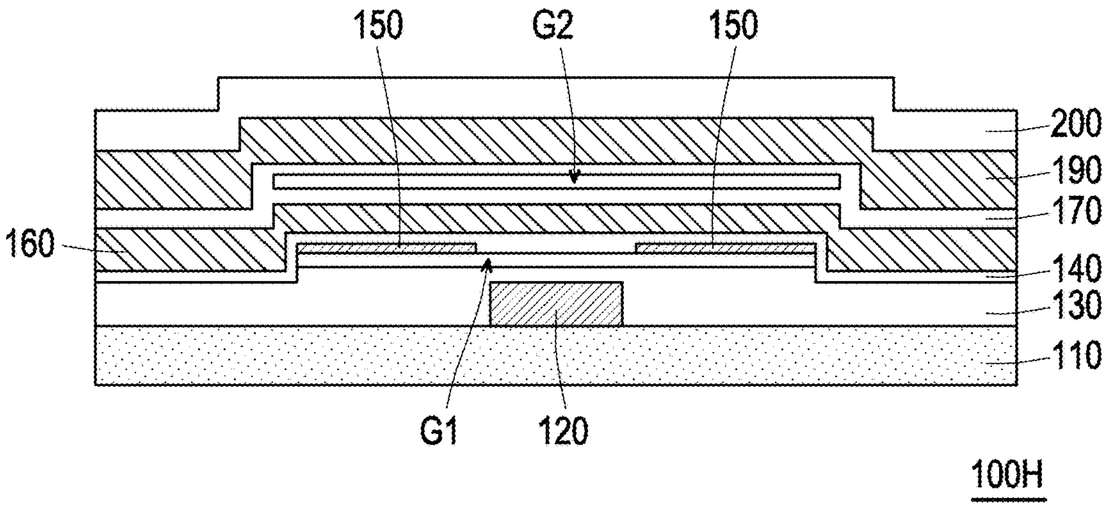
FIG. 10 is a schematic cross-sectional view of an ultrasonic oscillator element according to another embodiment of the disclosure.

FIG. 10 is a schematic cross-sectional view of an ultrasonic oscillator element according to another embodiment of the disclosure. Referring to FIG. 10, an ultrasonic oscillator element 100H shown in this embodiment is similar to the ultrasonic oscillator element 100D shown in FIG. 6. The difference between the two is that in this embodiment, the ultrasonic oscillator element 100H further includes a second cavity G2 disposed arranged between the second upper electrode and the first upper electrode. Specifically, the second cavity G2 is disposed inside the third insulating layer 170. However, in different embodiments, the second cavity G2 may also be designed to be adjacently disposed on any side of the third insulating layer 170 (not shown), and the disclosure is not limited thereto. In this way, the sensing sensitivity may be further improved.

Figure 11:
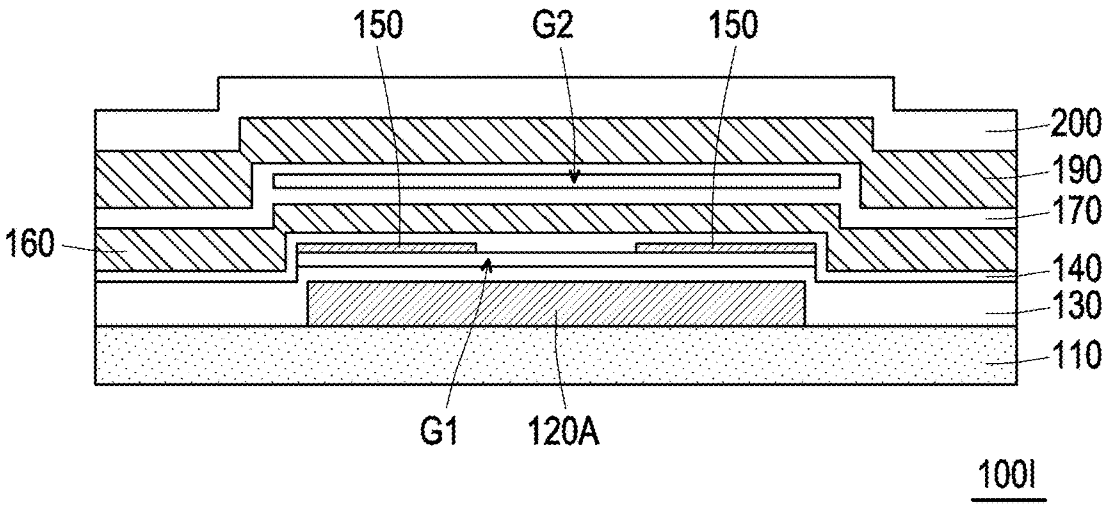
FIG. 11 is a schematic cross-sectional view of an ultrasonic oscillator element according to another embodiment of the disclosure.

FIG. 11 is a schematic cross-sectional view of an ultrasonic oscillator element according to another embodiment of the disclosure. Referring to FIG. 11, an ultrasonic oscillator element 100I shown in this embodiment is similar to the ultrasonic oscillator element 100H shown in FIG. 10. The difference between the two is that in this embodiment, the area of the first lower electrode 120A in the horizontal direction may be designed to increase so that the second lower electrode 150 overlaps at least part of the first lower electrode 120A in the stacking direction. In this way, since the area of the ground electrode is increased, the signal quality may be increased. In another embodiment, the area of the first lower electrode 120A in the horizontal direction may be designed to be increased beyond the range of the second lower electrode 150 in the stacking direction, or even completely overlap with the substrate 110 in the stacking direction (not shown).

Figure 12:
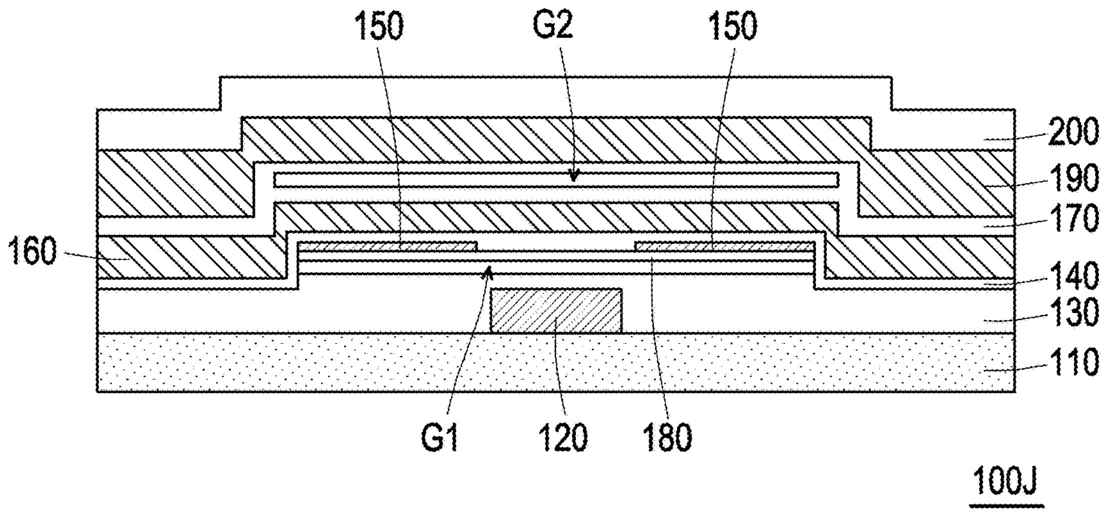
FIG. 12 is a schematic cross-sectional view of an ultrasonic oscillator element according to another embodiment of the disclosure.

FIG. 12 is a schematic cross-sectional view of an ultrasonic oscillator element according to another embodiment of the disclosure. Referring to FIG. 12, an ultrasonic oscillator element 100J shown in this embodiment is similar to the ultrasonic oscillator element 100H shown in FIG. 10. The difference between the two is that in this embodiment, the ultrasonic oscillator element 100J further includes a fourth insulating layer 180 disposed in the first cavity G1, and the second lower electrode 150 is located between the second insulating layer 140 and the fourth insulating layer 180. In this way, the manufacturing process may be simplified and the manufacturing yield of the ultrasonic oscillator element 100J may be improved.

Figure 13:
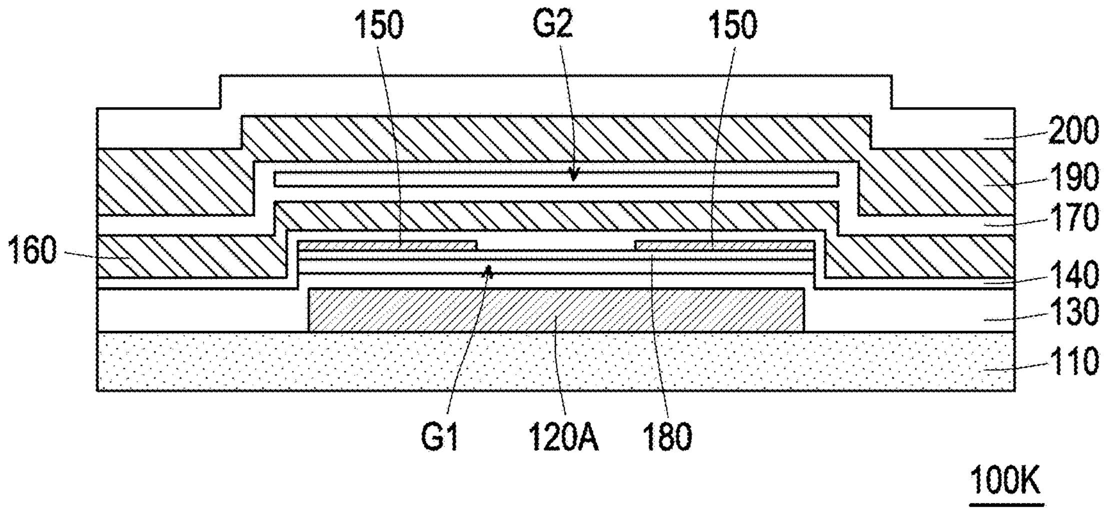
FIG. 13 is a schematic cross-sectional view of an ultrasonic oscillator element according to another embodiment of the disclosure.

FIG. 13 is a schematic cross-sectional view of an ultrasonic oscillator element according to another embodiment of the disclosure. Referring to FIG. 13, an ultrasonic oscillator element 100K shown in this embodiment is similar to the ultrasonic oscillator element 100J shown in FIG. 12. The difference between the two is that in this embodiment, the area of the first lower electrode 120A in the horizontal direction may be designed to increase so that the second lower electrode 150 overlaps at least part of the first lower electrode 120A in the stacking direction. In this way, since the area of the ground electrode is increased, the signal quality may be increased. In another embodiment, the area of the first lower electrode 120A in the horizontal direction may be designed to be increased beyond the range of the second lower electrode 150 in the stacking direction, or even completely overlap with the substrate 110 in the stacking direction (not shown).

To sum up, in the ultrasonic oscillator element and the ultrasonic transducer device in the disclosure, the ultrasonic oscillator element includes a substrate, a first lower electrode, a first insulating layer, a second insulating layer, a second lower electrode, a first upper electrode, and a third insulating layer. The second insulating layer and the first insulating layer form a first cavity, and the first cavity includes a central region and an outer region. The first lower electrode is disposed on the substrate, and the second lower electrode is disposed adjacent to the second insulating layer and located in the outer region of the first cavity, so that the first cavity is located between the first lower electrode and the second lower electrode. In this way, an electrode separation distance in an effective region may be greatly reduced, which in turn increases the capacitance and thus significantly improves the working efficiency of the capacitive micromachined ultrasonic transducer film.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. An ultrasonic oscillator element, comprising:

a substrate;

a first lower electrode, disposed on the substrate;

a first insulating layer, disposed such that the first lower electrode is located between the first insulating layer and the substrate;

a second insulating layer, forming a first cavity with the first insulating layer, wherein the first cavity is located between the first insulating layer and the second insulating layer, the first cavity comprises a central region and an outer region, and the second insulating layer has a first side and a second side opposite to each other;

a second lower electrode, disposed adjacent to the first side of the second insulating layer and located in the outer region of the first cavity;

a first upper electrode, disposed on the second side of the second insulating layer; and a third insulating layer, disposed such that the second lower electrode is located between the third insulating layer and the first insulating layer.

2. The ultrasonic oscillator element according to claim 1, wherein the first cavity is located between the first lower electrode and the second lower electrode.

3. The ultrasonic oscillator element according to claim 1, wherein the first upper electrode comprises a first portion and a second portion, at least part of the first portion overlaps the central region of the first cavity in a stacking direction, and at least part of the second portion overlaps the outer region of the first cavity in the stacking direction.

4. The ultrasonic oscillator element according to claim 3, wherein at least part of the first lower electrode overlaps the first portion of the first upper electrode in the stacking direction.

5. The ultrasonic oscillator element according to claim 3, wherein at least part of the second lower electrode overlaps the second portion of the first upper electrode in the stacking direction.

6. The ultrasonic oscillator element according to claim 3, wherein the first portion of the first upper electrode is driven by a DC signal relative to the first lower electrode to cause the second insulating layer to be concave toward the first cavity.

7. The ultrasonic oscillator element according to claim 3, wherein the second portion of the first upper electrode is driven by an AC signal to oscillate relative to the second lower electrode.

8. The ultrasonic oscillator element according to claim 1, wherein the second lower electrode overlaps at least part of the first lower electrode in a stacking direction.

9. The ultrasonic oscillator element according to claim 1, further comprising:

a fourth insulating layer, disposed in the first cavity, wherein the second lower electrode is located between the second insulating layer and the fourth insulating layer.

10. The ultrasonic oscillator element according to claim 1, further comprising:

a second upper electrode, disposed such that the third insulating layer is located between the second upper electrode and the first upper electrode; and a fifth insulating layer, disposed such that the second upper electrode is located between the fifth insulating layer and the third insulating layer.

11. The ultrasonic oscillator element according to claim 10, further comprising:

a second cavity, disposed between the second upper electrode and the first upper electrode.

12. The ultrasonic oscillator element according to claim 11, wherein the second cavity is adjacently disposed on any side of the third insulating layer or inside the third insulating layer.

13. An ultrasonic transducer device, comprising a plurality of ultrasonic oscillator elements disposed in an array, wherein each of the ultrasonic oscillator elements comprises:

a substrate;

a first lower electrode, disposed on the substrate;

a first insulating layer, disposed such that the first lower electrode is located between the first insulating layer and the substrate;

a second insulating layer, forming a first cavity with the first insulating layer, wherein the first cavity is located between the first insulating layer and the second insulating layer, the first cavity comprises a central region and an outer region, and the second insulating layer has a first side and a second side opposite to each other;

a second lower electrode, disposed adjacent to the first side of the second insulating layer and located in the outer region of the first cavity;

a first upper electrode, disposed on the second side of the second insulating layer; and a third insulating layer, disposed such that the second lower electrode is located between the third insulating layer and the first insulating layer.

14. The ultrasonic transducer device according to claim 13, wherein the first upper electrode comprises a first portion and a second portion, at least part of the first portion overlaps the central region of the first cavity in a stacking direction, and at least part of the second portion overlaps the outer region of the first cavity in the stacking direction.

15. The ultrasonic transducer device according to claim 14, wherein at least part of the first lower electrode overlaps the first portion of the first upper electrode in the stacking direction.

16. The ultrasonic transducer device according to claim 14, wherein at least part of the second lower electrode overlaps the second portion of the first upper electrode in the stacking direction.

17. The ultrasonic transducer device according to claim 13, wherein the each of the ultrasonic oscillator elements further comprises:

a fourth insulating layer, disposed in the first cavity to cover, wherein the second lower electrode is located between the second insulating layer and the fourth insulating layer.

18. The ultrasonic transducer device according to claim 13, wherein the each of the ultrasonic oscillator elements further comprises:

a second upper electrode, disposed such that the third insulating layer is located between the second upper electrode and the first upper electrode; and a fifth insulating layer, disposed such that the second upper electrode is located between the fifth insulating layer and the third insulating layer.

19. The ultrasonic transducer device according to claim 18, wherein the each of the ultrasonic oscillator elements further comprises:

a second cavity, disposed between the second upper electrode and the first upper electrode.

20. The ultrasonic transducer device according to claim 19, wherein the second cavity is adjacently disposed on any side of the third insulating layer or inside the third insulating layer.

* * * * *